(12) United States Patent
Ragan et al.

(10) Patent No.: US 7,676,206 B2
(45) Date of Patent: Mar. 9, 2010

(54) LOW NOISE, LOW DISTORTION RADIO RECEIVER FRONT-END

(75) Inventors: Lawrence Henry Ragan, Austin, TX (US); Matthew D. Felder, Austin, TX (US); Jingyu Hu, Austin, TX (US); Jamie Joseph Happ, Austin, TX (US); Michael R. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 985 days.

(21) Appl. No.: 11/294,663

(22) Filed: Dec. 5, 2005

(65) Prior Publication Data

US 2007/0129038 A1    Jun. 7, 2007

(51) Int. Cl.
H04B 1/06 (2006.01)
H04B 17/00 (2006.01)
H04B 7/00 (2006.01)

(52) U.S. Cl. ............... 455/232.1; 455/213; 455/226.1; 455/234.1; 455/230; 455/240.1

(58) Field of Classification Search ........... 455/230, 455/226.1–226.4, 232.1, 234.1, 280, 283, 455/289, 290–293, 296, 306–307, 334, 339–341, 455/130, 133–136, 168.1, 193.1, 193.2, 194.2, 455/195.1, 310, 316–317, 313, 278.1, 253.1, 455/222, 225, 552.1, 236.1, 240.1, 227, 241.1, 455/245.1–251.1, 138, 213
See application file for complete search history.

(56) References Cited

U.S. PATENT DOCUMENTS 4,862,181 A * 8/1989 Ponce de Leon et al. .... 343/702
6,816,718 B2 * 11/2004 Yan et al. ................ 455/317
6,850,748 B2 * 2/2005 Song et al. ............... 455/302
6,862,439 B2 * 3/2005 Feng ...................... 455/234.1
6,903,606 B1 * 6/2005 Yan et al. ..................... 330/9
6,941,121 B2 * 9/2005 Chen ....................... 455/232.1
6,985,711 B2 * 1/2006 Holenstein et al. ......... 455/312
7,072,632 B2 * 7/2006 Astrachan et al. ........ 455/226.2
7,116,092 B2 * 10/2006 Jenkins et al. ........... 324/76.19
7,164,901 B2 * 1/2007 Zheng et al. ............... 455/324
7,209,727 B2 * 4/2007 Castaneda et al. ......... 455/341
7,257,385 B2 * 8/2007 Ono et al. ............... 455/232.1
7,313,376 B1 * 12/2007 Hietala ................... 455/232.1

(Continued)

OTHER PUBLICATIONS

Yichuang Sun & Wai Kit Lau, "Antenna Impedance Matching Using Genetic Algorithms"; University of Hertfordshire, UK; National Conference on Antennas and Propagation: Mar.30-Apr. 1, 1999, Conference Publication No. 461, IEE, 1999; pp. 31-36.

(Continued)

*Primary Examiner*—Pablo N Tran
(74) *Attorney, Agent, or Firm*—Charles W. Bethards (57) ABSTRACT

A radio receiver front-end includes a tunable antenna interface and a low noise amplifying section. The tunable antenna interface is operably coupled to receive a wide bandwidth signal from an antenna, wherein the wide bandwidth signal includes a plurality of channel signals, and wherein the tunable antenna interface is tuned to pass a selected one of the plurality of channel signals substantially unattenuated and to attenuate remaining ones of the plurality of channel signals to produce a filtered wide bandwidth signal. The low noise amplifying section is operably coupled to amplify the filtered wide bandwidth signal to produce a filtered and amplified wide bandwidth signal.

22 Claims, 5 Drawing Sheets radio signal decoder 12

U.S. PATENT DOCUMENTS

| | | | |
|---|---|---|---|
| 7,336,937 B2 * | 2/2008 | Tervaluoto et al. | 455/232.1 |
| 2001/0036811 A1 * | 11/2001 | Kianush et al. | 455/41 |
| 2002/0079982 A1 * | 6/2002 | Lafleur et al. | 333/17.1 |
| 2005/0200425 A1 * | 9/2005 | McKay et al. | 333/26 |
| 2005/0233765 A1 * | 10/2005 | Sanders et al. | 455/552.1 |
| 2006/0098723 A1 * | 5/2006 | Toncich et al. | 375/219 |
| 2006/0238301 A1 * | 10/2006 | Wu et al. | 340/10.1 |
| 2007/0207754 A1 * | 9/2007 | Gomi | 455/193.3 |

OTHER PUBLICATIONS

Rofougaran, et al, "A Single-Chip 900 MHz Spread-Spectrum . . . ";IEEE Journal of Solid-State Circuits, vol. 33, No. 4, Apr. 1998; pp. 535-547.

Hall, et al, "Adapative Tuning of Microstrip Antennas"; 1997 The Institution of Electrical Engineers—The University of Birmingham, Edgbaston, Birmingham, UK; pp. 1-3.

Tran, et al, "Differential Transimpedance-Limiting Amplifier with Auto-Zero Feedback and High Dynamic Range"; IEEE Journal of Solid-State Circuits, vol. 39, No. 10, Oct. 2004; pp. 1680-1689.

Hu, et al, "A Monolithic 480 Mb/s Parallel AGC/Decision/Clock-Recovery Circuit . . . "; IEEE Journal of Solid-State Circuits, vol. 28, No. 12, Dec. 1993; pp. 1314-1320.

Zolomy, et al, "Automatic Antenna Tuning for RF Transmitter IC Applying High Q Antenna"; 2004 IEEE Radio Frequency Integrated Circuits Symposium; pp. 501-504.

Li, et al, "Low-Power Fully Integrated and Tunable CMOS RF Wireless Receiver for ISM Band Consumer Applications"; IEEE Transactions on Circuits and Systems-I: Regular Papers,vol. 52, No. 9, Sep. 2005; pp. 1758-1766.

Moritz, et al, "Frequency Agile Antenna Tuning and Matching"; University of Hertfordshire, UK; pp. 169-174.

Sun, et al, "Component Value Ranges of Tunable Impedance Matching Networks in RF Communications System";HF Radio Systems & Techniques; Jul. 7-10, 1997, Conference Publication No. 411, IEE. 1997; pp. 185-189.

Candy, et al, "A Per-Channel A/D Converter Having 1 5-Segment . . . "; IEEE Transactions on Communications, vol. Com-24, No. 1 Jan. 1976; pp. 33-42.

Philips Semiconductors, "TEA5767HN-Low-Power FM Stereo Radio for Handheld Applications"; Sep. 20, 2004; pp. 1-38.

* cited by examiner

FIG. 2
front-end 15

FIG. 3
front-end 15

FIG. 4
amplifier 50 or 52

FIG. 5
radio signal decoder 12

LOW NOISE, LOW DISTORTION RADIO RECEIVER FRONT-END

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to radio technology and more particularly to a radio receiver.

2. Description of Related Art

As is known, handheld digital audio systems are becoming very popular. Such systems include digital audio players/recorders that record and subsequently playback MP3 files, WMA files, etc. Such digital audio players/recorders may also be used as digital dictaphones and file transfer devices. Further expansion of digital audio players/recorders includes providing a frequency modulation (FM) radio receiver such that the device offers FM radio reception.

With most radio receivers, and particularly with FM Radio Receivers, minimizing noise is desirable. A typical FM receiver receives a wideband signal (e.g., 76 MHz to 108 MHz) that includes a plurality of channels (e.g., FM radio channels are spaced at 100 KHz). A low noise amplifier amplifies the received wideband FM signal, which is subsequently mixed with a local oscillation to produce an intermediate frequency (IF) signal. The intermediate frequency signal is mixed with a second local oscillation to produce a baseband signal. In each of these steps, if noise or distortion is above a desired level, the resulting baseband signal will have reduced fidelity. Further, in silicon CMOS implementations of a radio receiver, noise and distortion problems can be more severe than in traditional RF IC process technologies. CMOS transistors have less favorable noise and distortion performance compared to bipolar transistors. Therefore, RF IC designs implemented in silicon CMOS processes have different requirements and tradeoffs concerning noise and distortion. Additional complications arise in silicon CMOS RF design, in that digital circuitry is sometimes included in the same IC. The digital circuitry on the IC generates much more substrate noise and clock spurious responses, than traditional RF implementations. Managing the RF design in the presence of digital circuitry requires new mixed signal architectures and techniques in a silicon CMOS process.

Therefore, a need exists for a method and apparatus for a low noise low distortion radio receiver front end for use in a mixed signal environment.

DETAILED DESCRIPTION OF THE INVENTION

Figure 1:
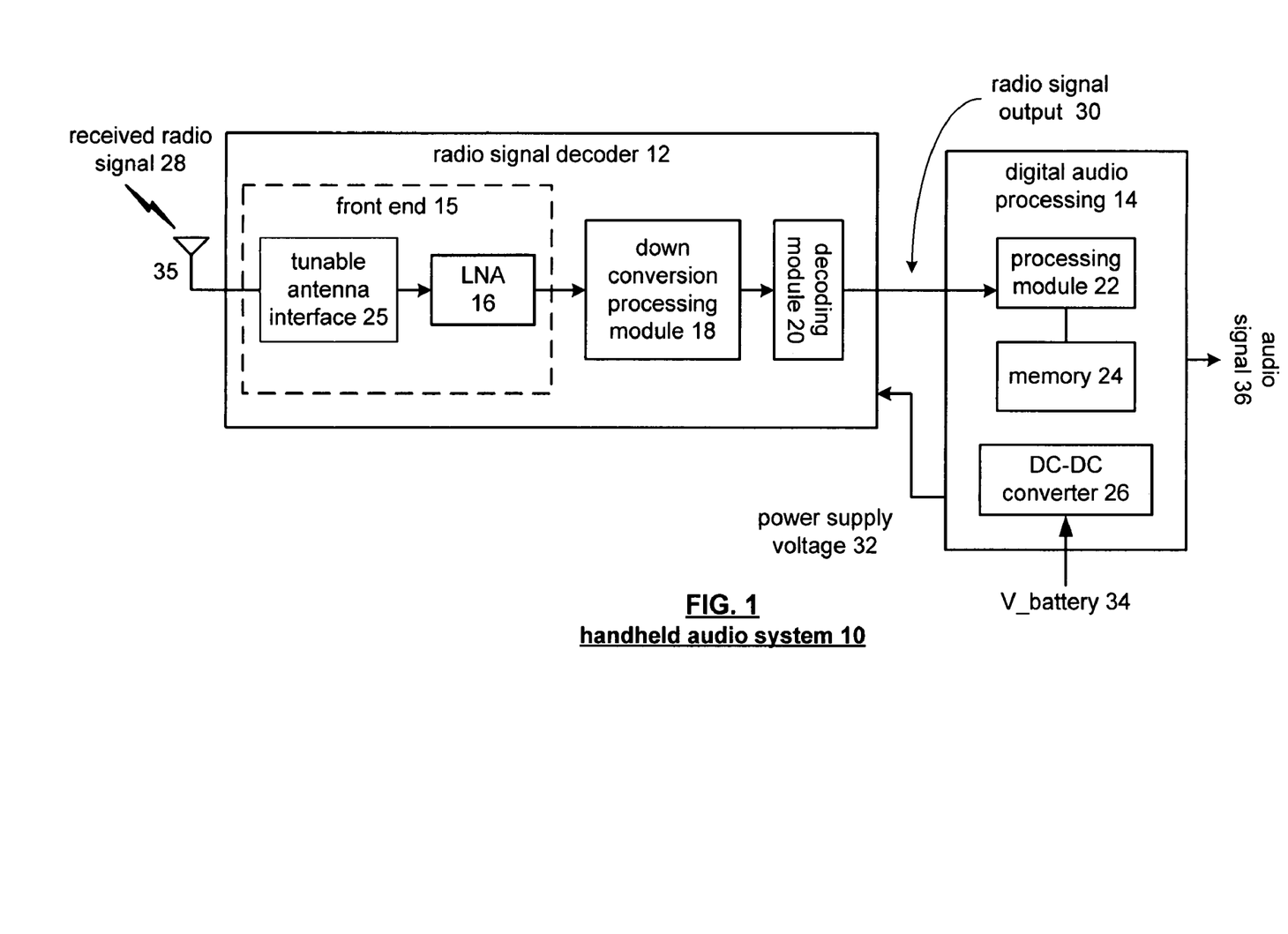
FIG. 1 is a schematic block diagram of a handheld audio system in accordance with the present invention.

FIG. 1 is a schematic block diagram of a handheld audio system 10 that includes a radio signal decoder 12 and a digital audio processing module 14. The radio signal decoder 12 includes a front end module 15, a down conversion processing module 18 and a decoding module 20. The front end module 15 includes a tunable antenna interface 25 and a low noise amplifier section 16. The digital audio processing module 14 includes a processing module 22, memory 24 and a DC to DC converter 26.

In operation, the radio signal decoder 12 receives a radio signal 28 via an antenna structure 35. The radio signal 28 may be a wide bandwidth FM signal that includes a plurality of radio channels. The tunable antenna interface 25 is tuned to pass a selected one of the plurality of channel signals and to attenuate all or most of remaining ones of the plurality of channel signals to produce a filtered wide bandwidth signal. For example, if the radio signal 28 is an FM signal that has a frequency spectrum from 76 MHz to 108 MHz, with channel spacing of a 100 KHz, if the selected channel is at 100.0 MHz, the tunable antenna interface 25 is tuned to pass the spectrum near the desired channel of 100.0 MHz and attenuate the other channels or at least most of the other channels. The low noise amplifier section 16 amplifies the filtered wide bandwidth signal to produce a filtered and amplified wide bandwidth signal. The front end 15 will be described in greater detail with reference to the remaining figures.

The down conversion processing module 18 converts the filtered and amplified wide bandwidth signal into a baseband signal (or a substantially baseband signal which has a carrier frequency at zero frequency, near zero frequency, or at a low IF) in accordance with one or more local oscillations. The decoding module 20 converts the baseband signal into a radio signal output 30. The radio signal output for a received FM signal may include a left plus right signal, left minus right signal, a pilot tone, and various subcarriers such as radio data service signal subcarrier. For a more detailed discussion of the down conversion processing module 18 refer to co-pending patent application having an attorney docket number of SIG000193 entitled REDUCED ADJACENT CHANNEL INTERFERENCE IN A RADIO RECEIVER. For a more detailed discussion of the decoding module 20 refer to co-pending patent application having an attorney docket number SIG000138, entitled Handheld Audio System, having a Ser. No. 11/126,554 and a filing date of May 11, 2005.

The digital audio processing module 14 receives the radio signal output 30 and produces there from an audio signal 36. The digital audio processing module 14 may be an MP3 decoder/thumb drive such as the ones manufactured and distributed by SigmaTel, Inc. For example, the digital audio processing module 14 may be an STMP35XX or an STMP36XX.

As shown, the DC to DC converter 26 converts a battery voltage 34 into a power supply voltage 32. The power supply voltage 32 may be provided to the radio signal decoder 12 to power the circuitry of the decoder 12. Alternatively, the radio signal decoder 12 could include its own DC to DC converter 26 and or directly run off of a battery. In various embodiments, the radio signal decoder 12 and the digital audio processor module 14 may be implemented on separate integrated circuits, on the same integrated circuit, or each implemented on a plurality of integrated circuits.

Figure 2:
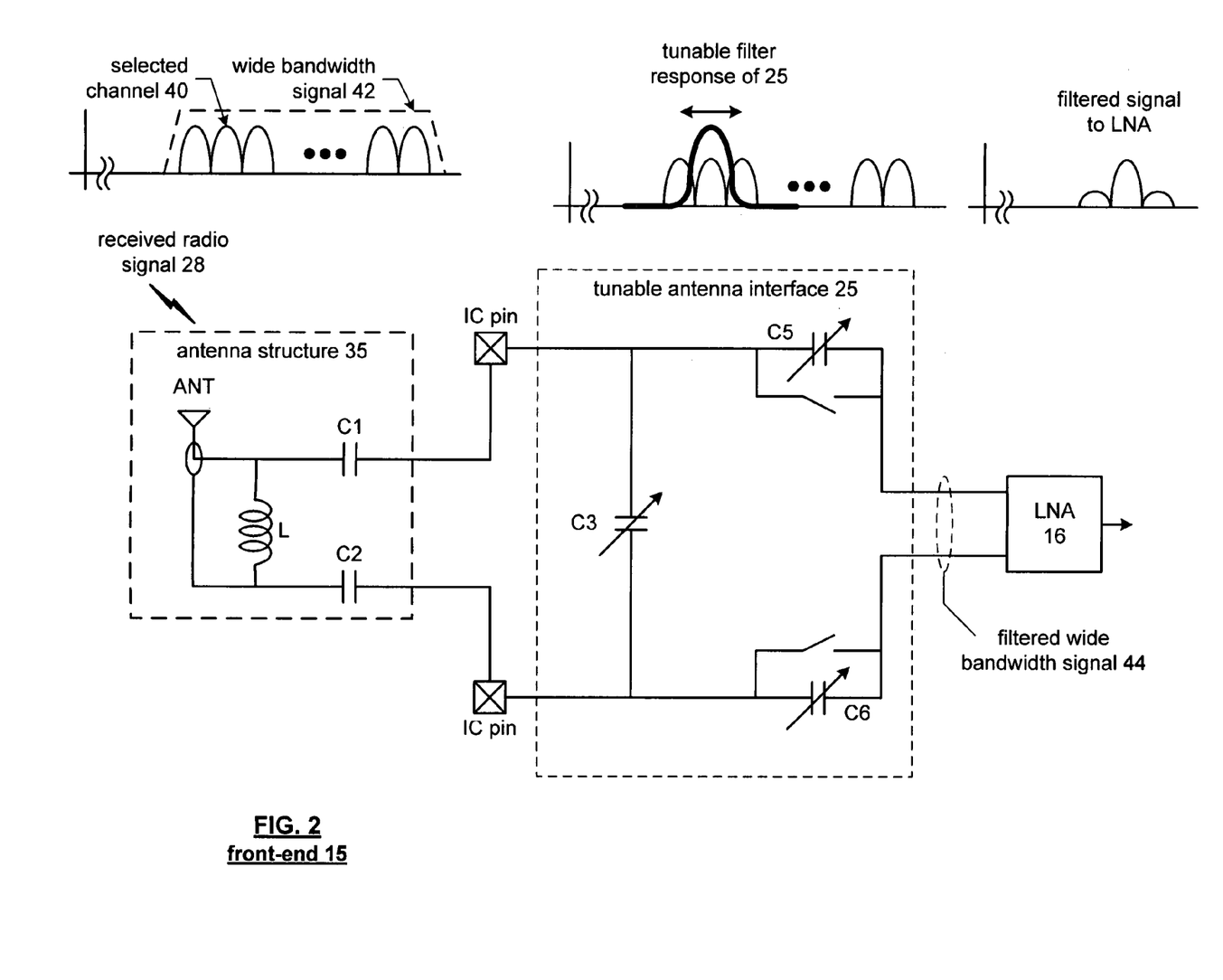
FIG. 2 is a schematic block diagram of a radio receiver front end in accordance with the present invention.

FIG. 2 is a schematic block diagram of an embodiment of the radio receiver front end 15. In this embodiment, the front end 15 includes the tunable antenna interface 25 and the low noise amplifier section 16, which may be implemented on an integrated circuit. The antenna structure 35 is shown to include two antennas (ANT), two coupling capacitors C1 and C2 and an inductor L. The coupling capacitors C1 and C2 couple the antenna structure to integrated circuit pins that are, in turn, coupled to the tunable antenna interface 25.

The tunable antenna interface 25 includes an adjustable capacitance circuit that includes one or more of a variable capacitor C3 and selectable variable capacitor circuits C5 and C6. The tunable capacitor C3, which may be a single capacitor or multiple capacitors with a common node, is adjusted via a control signal (which may be digitally controlled) based on a selected channel 40 such that the capacitance of the adjustable capacitor C3 in combination with the parasitic capacitance due to the physical layout of antenna structure 35, tunable antenna interface 25 and LNA 16 resonate with inductor (L). The selectable variable capacitor circuits C5 and C6, when not by-passed by its corresponding switches, in combination with input capacitance of the LNA, provide attenuation of the filtered wide bandwidth signal. Note that the selectable variable capacitor circuits C5 and C6 may be fixed capacitors, may be omitted, and may contribute in the tuning of the tunable antenna interface.

Once the tunable antenna interface 25 is tuned, it provides a filtered wide bandwidth signal 44 to the low noise amplifier section 16. In one embodiment, the low noise amplifier section 16 includes a low noise amplifier that is operably coupled to amplify the filtered wide bandwidth signal based on a gain setting. The low noise amplifier section also includes a gain control module that generates the gain setting based on at least one property corresponding to processing the filtered wide bandwidth signal. The at least one property includes one or more of signal strength of the filtered wide bandwidth signal, signal-to-noise ratio of the filtered wide bandwidth signal, power consumption of the low noise amplifier section, noise floor established by the low noise amplifier section, and distortion of the wide bandwidth signal.

FIG. 2 also illustrates a series of stylized frequency response diagrams corresponding to the received radio signal 28, the tunable filter response of the tunable antenna interface 25, and the filtered wide bandwidth signal 44. As shown, the wide bandwidth signal 42 includes a plurality of channels 44, including selected channel 40. The tunable filter response of the tunable antenna interface 25 is tuned to resonate at the frequency corresponding to the selected channel 40. For example, if the wide bandwidth signal 42 corresponds to an FM signal, the channels are spaced at 100 KHz from 78 MHz to 108 MHz. Note that not every channel will be used for a broadcast in a given region. Further note that the band pass region of the tunable antenna interface 25 is dependent upon the quality factor of the LC circuit produced by capacitor C3 (and optionally capacitors C5 and C6), parasitic capacitors, loss terms associated with Antenna structure 35, tunable antenna interface 25 and LNA 16 and the inductor L. Accordingly, the bandpass region of the tunable antenna interface 25 and antenna structure 35 may be equivalent to the bandwidth of one or more channels.

The tunable antenna interface 25 filters the wide bandwidth signal 42 to produce the filtered wide bandwidth signal 44. As shown, the filtered wide bandwidth signal 44 includes the selected channel 40 and some adjacent channels. Note that the number and signal strength of the adjacent channels of the filtered wide bandwidth signal 44 depends on the bandwidth and roll-off rate of the tunable antenna interface 25 in conjunction with antenna structure 35 and LNA 16.

In various embodiments, the components of the front-end circuit 15 may be on chip or off chip in any combination. For example, the coupling capacitors C1 and C2 could be on chip or removed entirely and connecting the inductor L directly to the tunable antenna interface 25. Alternatively, the entire tunable antenna interface 25 may be off chip. Also, capacitor C3 could be implemented with varactors or capacitor arrays with switch elements to change the size of the capacitance presented to the IC pins in tunable antenna interface 25.

Figure 3:
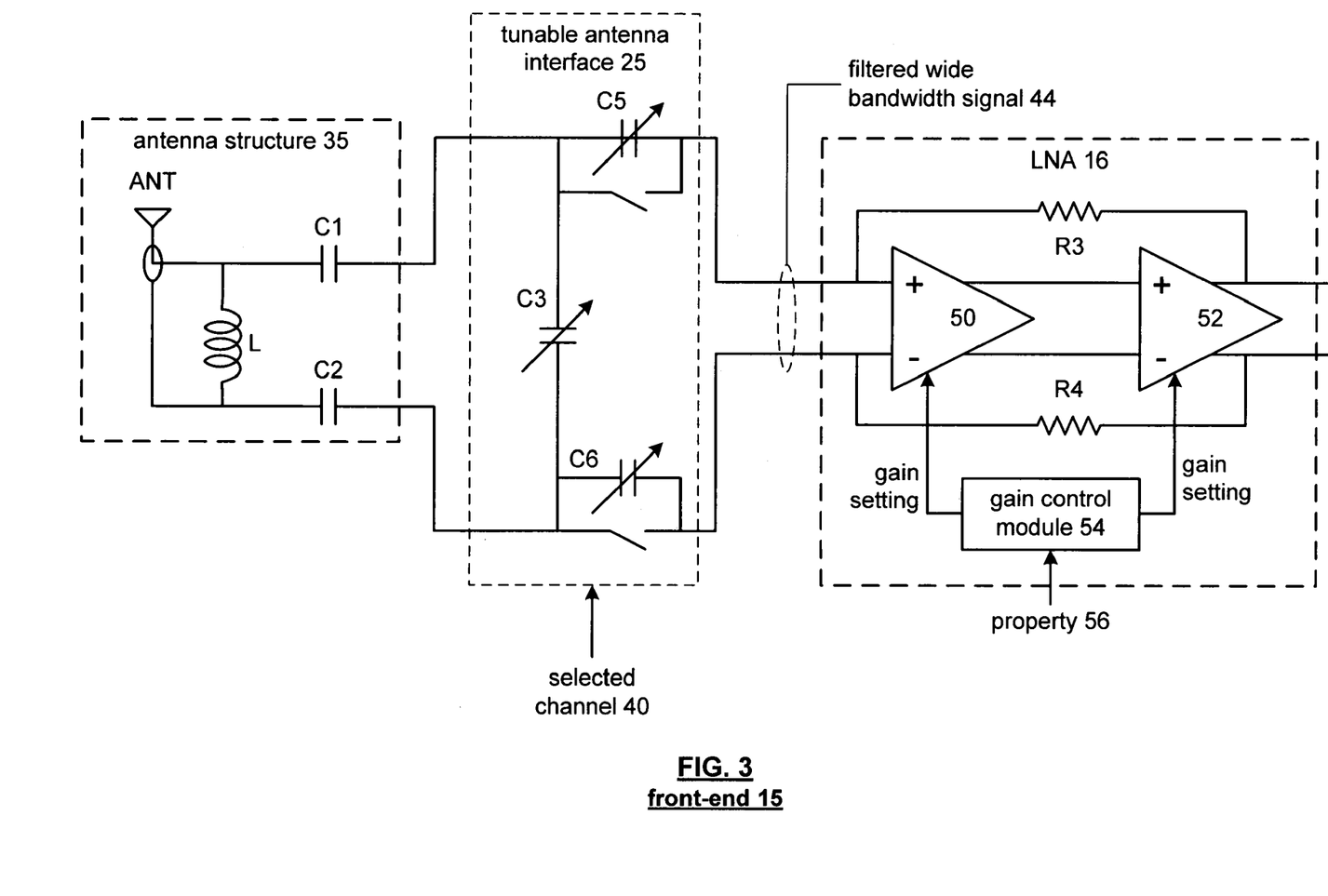
FIG. 3 is a schematic block diagram of another radio receiver front end in accordance with the present invention.

FIG. 3 is a schematic block diagram of another embodiment of the radio receiver front end 15. In this embodiment, the radio receiver front end 15 includes the tunable antenna 25 and the low noise amplifier section 16. The tunable antenna interface 25 is coupled to the antenna structure 35 as previously discussed with reference to FIG. 2. In this embodiment, the low noise amplifier section includes a first low noise amplifier 50, a second low noise amplifier 52, a feedback network (e.g., which is implemented via resistors R3 and R4) and a gain control module 54. The feedback network R3 and R4 is operably coupled to the first and second low noise amplifiers to, in concert with the capacitance at the input of the LNA 16 substantially reduce a DC offset at the output of LNA 16.

In such an embodiment, the DC gain of the LNA is reduced from the gain at the operating frequency so any input offset voltage due to manufacturing imperfections or other factors are amplified to the LNA output with substantially lowered gain, limiting their deleterious effect of subtracting from the operating dynamic range needed for processing signals. Use of the lower impedance of the LNA at the operating frequency as opposed to DC obviates the addition of a capacitor in the feedback path to form the low pass function. Note that each stage of LNA 16 may include common mode control loops such that the common mode voltage of the output stage 52 establishes the common mode voltage of the input to the LNA through resistors R3 and R4. Since almost no direct current flows into the input to LNA amplifier stage 50, the common mode voltage is effectively the same as that of the output from stage 52. Alternatively, substantially equal valued resistors may be employed in series across the LNA inputs, with the common point between them used to establish the common mode bias voltage.

The gain control module 54 establishes the gain settings for the first and second low noise amplifiers based on at least one property corresponding to processing of the filtered wide bandwidth signal. The at least one property may be one or more of signal strength of the filtered wide bandwidth signal, signal-to-noise ratio of the filtered wide bandwidth signal, power consumption of the low noise amplifier section, noise floor established by the low noise amplifier section, and distortion of the filtered wide bandwidth signal. In one embodiment, establishing the gain settings for the first and second low noise amplifier may be a trade off between noise performance, distortion, and power consumption (e.g., better noise performance is generally achieved with higher gain in the first stage, but increases power consumption and may increase distortion). As such, based on the at least one property of the filtered wide bandwidth signal and the balancing of noise, distortion, and power consumption, the gain control module 54 establishes the gain settings for the first and second amplifiers 50 and 52.

Figure 4:
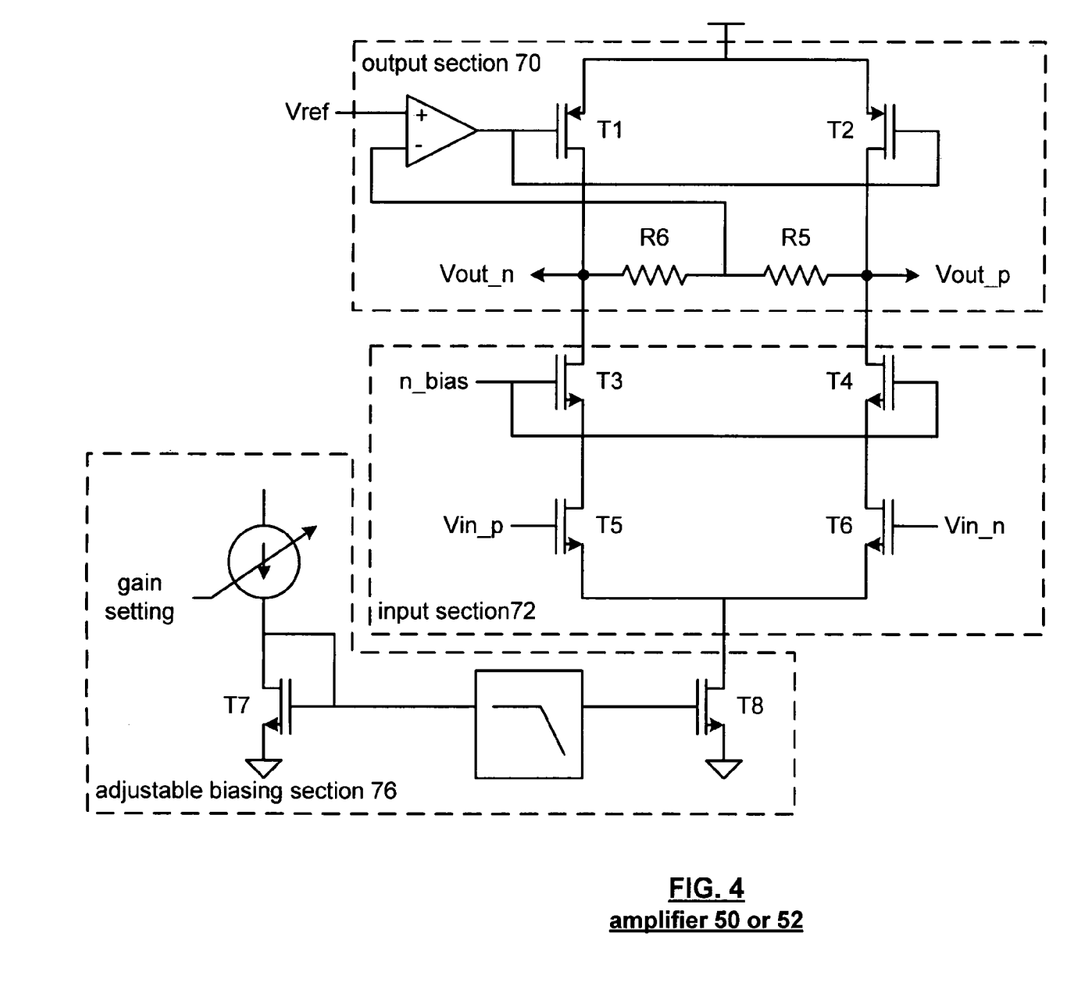
FIG. 4 is a schematic block diagram of an amplifier in accordance with the present invention.

FIG. 4 is a schematic block diagram of the first or second low noise amplifier 50 or 52. The amplifier includes an output section 70, and input section 72 and adjustable biasing section 76. The output section 70 includes transistors T1 and T2, resistors R5 and R6 and an amplifier to control the common mode voltage of the amplifier. The differential output (Vout_N and Vout_P) are produced at the nodes shown.

The input section 72 includes transistors T3 through T6. Transistors T3 and T4 help to reduce the Miller effect on the input device from creating a large capacitance as seen from the input of the low noise amplifier 50 or 52. Transistors T5 and T6 are operably coupled to receive a differential input (Vin_P and Vin_N). The common mode voltage at Vout_n and Vout_p is established by the feedback loop consisting of the operational amplifier 53, transistors T1 and T2, and resistors R5 and R6. The feedback loop drives the voltage at the common point between R5 and R6 to equal the common mode reference voltage Vref.

The adjustable biasing section 76 includes an adjustable current source, transistors T7 and T8, and a low pass filter. The adjustable current source is adjusted based on the desired gain setting and provides a current to transistor T7. Transistor T7 acts as a current mirror for transistor T8 via the low pass filter, which smoothes the gain adjustment during normal operation. In this embodiment, the gain of the amplifier is set based on the input transconductance and the output resistance. The output resistance is connected between the outputs and not in series such that the bias point of the output can be held relatively constant while the bias current is changed to adjust the gain.

Figure 5:
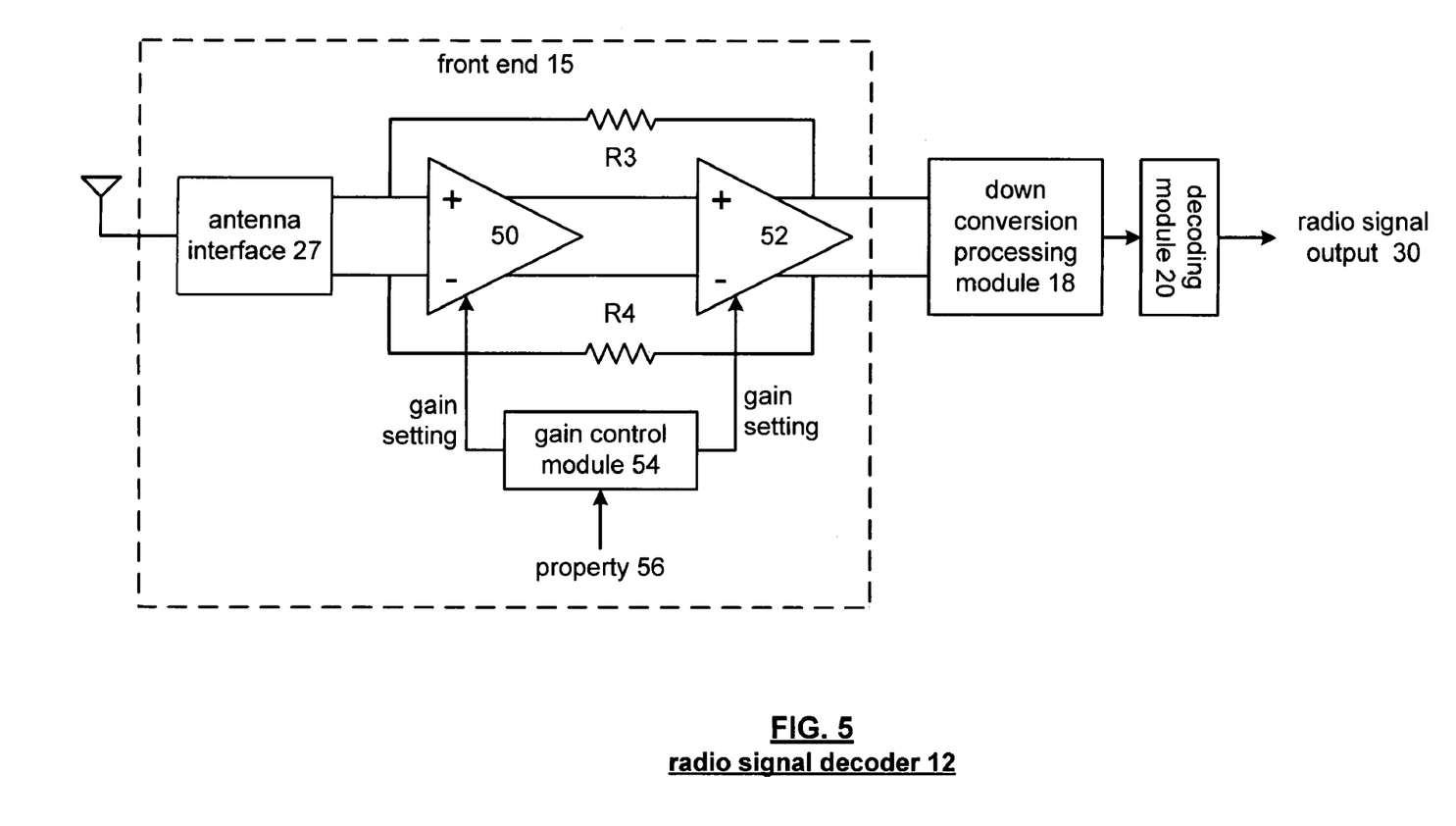
FIG. 5 is a schematic block diagram of a radio signal decoder in accordance with the present invention.

FIG. 5 is a schematic block diagram of another embodiment of the radio signal decoder 12. In this embodiment, the radio signal decoder 12 includes a radio receiver front end 15, the down conversion processing module 18, and the decoding module 20. The radio receiver front end 15 includes an antenna interface 27, a first low noise amplifier 50, a second low noise amplifier 52, a feedback network (which may be implemented via resistors R3 and R4), and a gain control module 54.

The antenna interface 27 may be similar to the tunable antenna interface 25 where the adjustable capacitor is omitted or replaced with a fixed capacitor. The first and second low noise amplifier in combination with the gain control module 54 operates as previously discussed with reference to FIG. 3.

In general, small portable devices such as music players and cell phones are physically much smaller than a wavelength at the operating frequencies used for broadcasting services, such as the AM (near 1 MHz) and FM (near 100 MHz) bands and contain no contact to "earth" or "ground". As such, the antenna structure 35 may include a portion of the leads to the headphones of a portable music player for one connection and the common node of the player for the other connection. In this configuration example, the antenna structure is providing a very short unbalanced dipole, where the input impedance to such a dipole can be modeled as a very high resistance in parallel with a small capacitance. Inductor L is chosen to resonate with the antenna capacitance and the effective capacitance of the tunable antenna interface 25. To obtain a desired level of performance, the quality factor "Q" of the circuit formed by inductor L and tunable antenna interface 25 should be as high as feasible. This can be understood from the fact that the equivalent parallel resistance of an inductor consists of a resistor whose value is approximately equal to Q times the reactance of the inductor. This equivalent resistor shunts some of the signal intercepted by the short antenna, and contributes thermal noise to the total at the LNA input so it is beneficial for it to be as large as possible; hence the highest Q is desirable. An upper limitation on the Q of the antenna circuit is the bandwidth of the desired signal. In the practical case of physically small inductors such as are economic for portable consumer devices, this limitation is typically not approached.

While the antenna configuration of FIGS. 2 and 3 is appropriate for amplifiers with high impedances, an amplifier with low impedance would be more appropriately matched with a series resonant configuration. While the amplifiers shown are receiving the signal from the antenna, amplifiers that drive the antenna could also be employed to create a transmitter. The same choice of topography applies to transmitters. A high impedance amplifier calls for a parallel resonant structure, and a low impedance amplifier is best suited to a series resonant structure.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The preceding discussion has presented a low noise low distortion radio receiver front end that may be used as part of a radio signal decoder. In the various embodiments described that include a tunable antenna interface 25 and/or a multistage low noise amplifier section, noise within a radio receiver may be better controlled to reduce its adverse affects on the resulting radio signal output. As one of average skill in the art will appreciate, other embodiments may be derived from the teaching of the present invention without deviating from the scope of the claims.

What is claimed is:

1. A radio receiver front-end comprises:
   a tunable antenna interface operably coupled to filter a wide bandwidth signal to produce a filtered wide bandwidth signal in accordance with a band pass region, wherein the wide bandwidth signal includes a plurality of channel signals, wherein the tunable antenna interface is tuned such that the band pass region includes a selected one of the plurality of channel signals, and wherein the band pass region is narrower than the wide bandwidth signal; and
   a low noise amplifying section operably coupled to amplify the filtered wide bandwidth signal to produce a filtered and amplified wide bandwidth signal, the low noise amplifying section further comprising offset correction and gain control circuits
   wherein the low noise amplifying section comprises:
   a first low noise amplifier operably coupled to amplify the filtered wide bandwidth signal based on a first gain setting to produce a first filtered and amplified wide bandwidth signal;
   a second low noise amplifier operably coupled to amplify the first filtered and amplified wide bandwidth signal based on a second gain setting to produce the filtered and amplified wide bandwidth signal;
   a feedback network operably coupled to the first and second low noise amplifiers to substantially cancel a DC (direct current) offset of the low noise amplifier section; and
   a gain control module operably coupled to produce the first and second gain settings based on at least one property corresponding to processing the filtered wide bandwidth signal.

2. The radio receiver front-end of claim 1, wherein the tunable antenna interface comprises:
   an adjustable capacitance circuit operably coupled to an antenna structure, wherein the antenna structure includes an antenna, an inductor, and coupling capacitors, wherein the adjustable capacitance circuit is adjusted via a control signal such that the inductor, the coupling capacitors, and the adjustable capacitance circuit resonate at a frequency corresponding to the band pass region.

3. The radio receiver front-end of claim 2, wherein the tunable antenna interface comprises at least one of:
   a parallel adjustable capacitor operably coupled in parallel with the coupling capacitors;
   a first series adjustable capacitor circuit operably coupled in series with a first of the coupling capacitors; and
   a second series adjustable capacitor circuit operably coupled in series with a second of the coupling capacitors.

4. The radio receiver front-end of claim 1, wherein the at least one property corresponding to processing the wide bandwidth signal comprises at least one of:
   signal strength of the filtered wide bandwidth signal;
   signal to noise ratio of the wide bandwidth signal;
   power consumption of the low noise amplifier section;
   noise floor established by the low noise amplifier section; and
   distortion of the wide bandwidth signal.

5. The radio receiver front-end of claim 1, wherein each of the first and second low noise amplifiers comprises:
   an output section biased in accordance with a common mode reference;
   input section operably coupled to the output section and to receive an input signal, wherein the input signal is the filtered wide bandwidth signal or the first filtered and amplified wide bandwidth signal; and
   an adjustable biasing section operably coupled to bias the input section, wherein the bias is adjusted in accordance with the first or second gain setting and wherein gain of the first or second low noise amplifier is based on input transconductance of the input section established by the bias and impedance of the output section.

6. A radio receiver front-end comprises:
   an antenna interface operably coupled to receive a wide bandwidth signal from an antenna, wherein the wide bandwidth signal includes a plurality of channel signals; and
   a first low noise amplifier operably coupled to amplify the wide bandwidth signal based on a first gain setting to produce a first amplified wide bandwidth signal;
   a second low noise amplifier operably coupled to amplify the first amplified wide bandwidth signal based on a second gain setting to produce an amplified wide bandwidth signal;
   a feedback network operably coupled to the first and second low noise amplifiers to substantially cancel a DC (direct current) offset of at least one of the first and second low noise amplifiers; and
   a gain control module operably coupled to produce the first and second gain settings based on at least one property corresponding to processing the wide bandwidth signal.

7. The radio receiver front-end of claim 6, wherein the antenna interface comprises:
   a tunable antenna interface that is tuned such that a band pass region of the tunable antenna interface includes a selected one of the plurality of channel signals, and wherein the band pass region is narrower than the wide bandwidth signal.

8. The radio receiver front-end of claim 7, wherein the tunable antenna interface comprises:
   an adjustable capacitance circuit operably coupled to an antenna structure, wherein the antenna structure includes the antenna, an inductor, and coupling capacitors, and wherein the adjustable capacitance circuit is adjusted via a control signal such that the inductor, the coupling capacitors, and the adjustable capacitance resonate at a frequency corresponding to the selected one of the plurality of channels.

9. The radio receiver front-end of claim 8, wherein the tunable antenna interface comprises at least one of:
   a parallel adjustable capacitor operably coupled in parallel with the coupling capacitors;
   a first series adjustable capacitor circuit operably coupled in series with a first of the coupling capacitors; and;
   a second series adjustable capacitor circuit operably coupled in series with a second of the coupling capacitors.

10. The radio receiver front-end of claim 6, wherein the at least one property corresponding to processing the wide bandwidth signal comprises at least one of:
    signal strength of the filtered wide bandwidth signal;
    signal to noise ratio of the wide bandwidth signal;
    power consumption of the low noise amplifier section;
    noise floor established by the low noise amplifier section; and
    distortion of the wide bandwidth signal.

11. The radio receiver front-end of claim 6, wherein each of the first and second low noise amplifiers comprises:
    an output section biased in accordance with a common mode reference;

input section operably coupled to the output section and to receive an input signal, wherein the input signal is the filtered wide bandwidth signal or the first filtered and amplified wide bandwidth signal; and an adjustable biasing section operably coupled to bias the input section, wherein the bias is adjusted in accordance with the first or second gain setting, and wherein gain of the first or second low noise amplifier is based on input transconductance of the input section established by the bias and impedance of the output section.

12. A radio receiver comprises:
a radio receiver front-end that includes:
   a tunable antenna interface operably coupled to filter a wide bandwidth signal to produce a filtered wide bandwidth signal in accordance with a band pass region, wherein the wide bandwidth signal includes a plurality of channel signals, wherein the tunable antenna interface is tuned such that the band pass region includes a selected one of the plurality of channel signals, and wherein the band pass region is narrower than the wide bandwidth signal; and
   to produce a filtered and amplified wide bandwidth signal, the low noise a low noise amplifying section operably coupled to amplify the filtered wide bandwidth signal amplifying section further comprising offset correction and gain control circuits,
   wherein the low noise amplifying section comprises:
      a first low noise amplifier operably coupled to amplify the filtered wide bandwidth signal based on a first gain setting to produce a first filtered and amplified wide bandwidth signal;
      a second low noise amplifier operably coupled to amplify the first filtered and amplified wide bandwidth signal based on a second gain setting to produce the filtered and amplified wide bandwidth signal;
      a feedback network operably coupled to the first and second low noise amplifiers to substantially cancel a DC (direct current) offset of the low noise amplifier section; and
      a gain control module operably coupled to produce the first and second gain settings based on at least one property corresponding to processing the wide bandwidth signal;
   a down conversion section operably coupled to convert the filtered and amplified wide bandwidth signal into a substantially baseband signal; and
   a decoding module operably coupled to convert the substantially baseband signal into a radio signal output.

13. The radio receiver of claim 12, wherein the tunable antenna interface comprises:
   an adjustable capacitance circuit operably coupled to an antenna structure, wherein the antenna structure includes the antenna, an inductor, and coupling capacitors, and wherein the adjustable capacitance circuit is adjusted via a control signal such that the inductor, the coupling capacitors, and the adjustable capacitance resonate at a frequency corresponding to the selected one of the plurality of channels.

14. The radio receiver of claim 13, wherein the tunable antenna interface comprises at least one of:
   a parallel adjustable capacitor operably coupled in parallel with the coupling capacitors;
   a first series adjustable capacitor circuit operably coupled in series with a first of the coupling capacitors; and
   a second series adjustable capacitor circuit operably coupled in series with a second of the coupling capacitors.

15. The radio receiver of claim 12, wherein the at least one property corresponding to processing the wide bandwidth signal comprises at least one of:
   signal strength of the filtered wide bandwidth signal;
   signal to noise ratio of the wide bandwidth signal;
   power consumption of the low noise amplifier section;
   noise floor established by the low noise amplifier section; and
   distortion of the wide bandwidth signal.

16. The radio receiver of claim 12, wherein each of the first and second low noise amplifiers comprises:
   an output section biased in accordance with a common mode reference;
   input section operably coupled to the output section and to receive an input signal, wherein the input signal is the filtered wide bandwidth signal or the first filtered amplified wide bandwidth signal; and
   an adjustable biasing section operably coupled to bias the input section, wherein the bias is adjusted in accordance with the first or second gain setting, and wherein gain of the first or second low noise amplifier is based on input transconductance of the input section established by the bias and impedance of the output section.

17. A radio receiver comprises:
a radio receiver front-end that includes:
   an antenna interface operably coupled to receive a wide bandwidth signal from an antenna, wherein the wide bandwidth signal includes a plurality of channel signals; and
   a first low noise amplifier operably coupled to amplify the wide bandwidth signal based on a first gain setting to produce a first amplified wide bandwidth signal;
   a second low noise amplifier operably coupled to amplify the first amplified wide bandwidth signal based on a second gain setting to produce an amplified wide bandwidth signal;
   a feedback network operably coupled to the first and second low noise amplifiers to substantially cancel a DC (direct current) offset of at least one of the first and second low noise amplifiers; and
   a gain control module operably coupled to produce the first and second gain settings based on at least one property corresponding to processing the wide bandwidth signal; and
   a down conversion section operably coupled to convert the amplified wide bandwidth signal into a substantially baseband signal; and
   a decoding module operably coupled to convert the substantially baseband signal into a radio signal output.

18. The radio receiver of claim 17, wherein the antenna interface comprises:
   a tunable antenna interface that is tuned such that a band pass region of the tunable antenna interface includes a selected one of the plurality of channel signals, and wherein the band pass region is narrower than the wide bandwidth signal.

19. The radio receiver of claim 18, wherein the tunable antenna interface comprises:
   an adjustable capacitance circuit operably coupled to an antenna structure, wherein the antenna structure includes the antenna, an inductor, and coupling capacitors, and wherein the adjustable capacitance circuit is adjusted via a control signal such that the inductor, the coupling capacitors, and the adjustable capacitance resonate at a frequency corresponding to the selected one of the plurality of channels.

20. The radio receiver of claim 19, wherein the tunable antenna interface comprises at least one of:
   a parallel adjustable capacitor operably coupled in parallel with the coupling capacitors;
   a first series adjustable capacitor circuit operably coupled in series with a first of the coupling capacitors; and
   a second series adjustable capacitor circuit operably coupled in series with a second of the coupling capacitors.

21. The radio receiver of claim 17, wherein the at least one property corresponding to processing the wide bandwidth signal comprises at least one of:
   signal strength of the filtered wide bandwidth signal;
   signal to noise ratio of the wide bandwidth signal;
   power consumption of the low noise amplifier section;
   noise floor established by the low noise amplifier section; and
   distortion of the wide bandwidth signal.

22. The radio receiver of claim 17, wherein each of the first and second low noise amplifiers comprises:
   an output section biased in accordance with a common mode reference;
   input section operably coupled to the output section and to receive an input signal, wherein the input signal is the filtered wide bandwidth signal or the first filtered and amplified wide bandwidth signal; and
   an adjustable biasing section operably coupled to bias the input section, wherein the bias is adjusted in accordance with the first or second gain setting, and wherein gain of the first or second low noise amplifier is based on input transconductance of the input section established by the bias and impedance of the output section.

* * * * *